(12) United States Patent
Kim et al.

(10) Patent No.: US 8,995,551 B2
(45) Date of Patent: Mar. 31, 2015

(54) APPARATUS AND METHOD FOR GENERATING CODEBOOK IN A WIRELESS COMMUNICATION SYSTEM

(75) Inventors: Hyung Tae Kim, Gyeonggi-do (KR);
Han Byul Seo, Gyeonggi-do (KR);
Byoung Hoon Kim, Gyeonggi-do (KR);
Ki Jun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 13/636,472

(22) PCT Filed: Mar. 22, 2011

(86) PCT No.: PCT/KR2011/001958
§ 371 (c)(1),
(2), (4) Date: Sep. 21, 2012

(87) PCT Pub. No.: WO2011/118962
PCT Pub. Date: Sep. 29, 2011

(65) Prior Publication Data
US 2013/0016764 A1    Jan. 17, 2013

Related U.S. Application Data

(60) Provisional application No. 61/315,988, filed on Mar. 22, 2010.

(51) Int. Cl.
*H04B 7/02* (2006.01)
*H04L 1/02* (2006.01)
*H04L 25/03* (2006.01)
*H04L 25/02* (2006.01)

(52) U.S. Cl.
CPC ....... *H04L 25/03343* (2013.01); *H04L 25/0204* (2013.01); *H04L 25/0242* (2013.01)

USPC .......... 375/267; 375/219; 375/299; 375/347; 370/334; 455/69; 455/101

(58) Field of Classification Search
USPC .................. 375/267, 299, 347, 219; 370/334; 455/69, 101
See application file for complete search history.

(56) References Cited

U.S. PATENT DOCUMENTS

2007/0286304 A1    12/2007    Kim et al.
2009/0067512 A1*   3/2009     Mielczarek et al. .......... 375/245
(Continued)

FOREIGN PATENT DOCUMENTS

KR    10-2011-0025058 A    3/2011

OTHER PUBLICATIONS

Search Report issued in corresponding International Application No. PCT/KR2011/001958 dated Nov. 21, 2011.

*Primary Examiner* — Ted Wang
(74) *Attorney, Agent, or Firm* — Morgan, Lewis & Bockius LLP

(57) ABSTRACT

An apparatus and method for generating a codebook in a wireless communication system are disclosed. The codebook generation apparatus includes a processor for generating a covariance matrix of a channel between the transmitting end and a receiving end, using a unitary matrix including a first vector corresponding to at least one quantized dominant singular singular vector of the channel and a second vector corresponding to at least one basis vector of a null space of the first vector, and transforming a predefined first codebook by applying the covariance matrix of the channel to the first codebook.

15 Claims, 3 Drawing Sheets

(56) References Cited

U.S. PATENT DOCUMENTS

2010/0056216 A1  3/2010  Li et al.
2010/0266054 A1* 10/2010 Mielczarek et al. .......... 375/260
2011/0058598 A1* 3/2011 Gaur ............................ 375/233
2011/0096755 A1  4/2011  Clerckx et al.
2013/0064276 A1* 3/2013 Kim et al. .................... 375/219

* cited by examiner

APPARATUS AND METHOD FOR GENERATING CODEBOOK IN A WIRELESS COMMUNICATION SYSTEM

TECHNICAL FIELD

The present invention relates to wireless communication, and more particularly, to an apparatus and method for generating a codebook in a Multiple Input Multiple Output (MIMO) wireless communication system.

BACKGROUND ART

In a cellular MIMO communication environment, data rate can be increased through beamforming between a transmitting end and a receiving end.

It is determined based on channel information whether to use beamforming or not. Basically, the receiving end quantizes channel information estimated from a reference signal to a codebook and feeds back the codebook to the transmitting end.

A brief description will be given of a spatial channel matrix (also referred to simply as a channel matrix) for use in generating a codebook. The spatial channel matrix or channel matrix may be expressed as $$H(i,k) = \begin{bmatrix} h_{1,1}(i,k) & h_{1,2}(i,k) & \cdots & h_{1,Ni}(i,k) \\ h_{2,1}(i,k) & h_{2,2}(i,k) & \cdots & h_{2,Ni}(i,k) \\ \vdots & \vdots & \ddots & \vdots \\ h_{Nr,1}(i,k) & h_{Nr,2}(i,k) & \cdots & h_{Nr,Ni}(i,k) \end{bmatrix}$$

where $H(i,k)$ denotes the spatial channel matrix, $N_r$ denotes the number of Reception (Rx) antennas, $N_t$ denotes the number of Transmission (Tx) antennas, r denotes the index of an Rx antenna, t denotes the index of a Tx antenna, i denotes the index of an Orthogonal Frequency Division Multiplexing (OFDM) or Single Carrier-Frequency Division Multiple Access (SC-FDMA) symbol, and k denotes the index of a subcarrier. Thus $h_{r,t}(i,k)$ is an element of the channel matrix $H(i,k)$, representing the channel state of a $t^{th}$ Tx antenna and an $r^{th}$ Rx antenna on a $k^{th}$ subcarrier and an $i^{th}$ symbol.

A spatial channel covariance matrix R that is applicable to the present invention is expressed as $R=E[H_{r,t}H_{r,t}^H]$ where H denotes the spatial channel matrix and E[ ] denotes a mean.

Singular Value Decomposition (SVD) is one of significant factorizations of a rectangular matrix, with many applications in signal processing and statistics. SVD is a generalization of the spectral theorem of matrices to arbitrary rectangular matrices. Spectral theorem says that an orthogonal square matrix can be unitarily diagonalized using a base of eigenvalues. Let the channel matrix H be an m×m matrix having real or complex entries. Then the channel matrix H may be expressed as the product of the following three matrices.

$$H_{m \times m} = U_{m \times m} \Sigma_{m \times n} V_{n \times n}^H$$

where U and V are unitary matrices and $\Sigma$ is an m×n diagonal matrix with non-negative singular values. For the singular values, $\Sigma=\text{diag}(\sigma_1 \ldots \sigma_r), \sigma_i=\sqrt{\lambda_1}$. The directions of the channels and strengths allocated to the channel directions are known from the SVD of the channels. The channel directions are represented as the left singular matrix U and the right singular matrix V. Among r independent channels created by MIMO, the direction of an $i^{th}$ channel is expressed as $i^{th}$ column vectors of the singular matrices U and V and the channel strength of the $i^{th}$ channel is expressed as $\sigma_i^2$.

Because each of the singular matrices U and V is composed of mutually orthogonal column vectors, the $i^{th}$ channel can be transmitted without interference with a $j^{th}$ channel. The direction of a dominant channel having a large $\sigma_i^2$ value exhibits a relatively small variance over a long time or across a wide frequency band, whereas the direction of a channel having a small $\sigma_i^2$ value exhibits a large variance.

This factorization into the product of three matrices is called SVD. The SVD is very general in the sense that it can be applied to any matrices whereas EigenValue Decomposition (EVD) can be applied only to orthogonal square matrices. Nevertheless, the two decompositions are related.

If the channel matrix H is a positive, definite Hermitian matrix, all eigenvalues of the channel matrix H are non-negative real numbers. The singular values and singular vectors of the channel matrix H are its eigenvalues and eigenvectors.

The EVD may be expressed as $$HH^H=(U\Sigma V^H)(U\Sigma V^H)^H=U\Sigma\Sigma^T U^H$$

$$H^H H=(U\Sigma V^H)^H(U\Sigma V^H)=V\Sigma^T\Sigma V$$

where the eigenvalues may be $\lambda_1 \ldots \lambda_r$. Information about the singular matrix U representing channel directions is known from the SVD of $HH^H$ and information about the singular matrix V representing channel directions is known from the SVD of $H^H H$. In general, Multi-User MIMO (MU-MIMO) adopts beamforming at a transmitting end and a receiving end to achieve high data rates. If reception beams and transmission beams are represented as matrices T and W respectively, channels to which beamforming is applied are expressed as $THW=TU(E)V^H W$. Accordingly, it is preferable to generate reception beams based on the singular matrix U and to generate transmission beams based on the singular matrix V.

DISCLOSURE

Technical Problem

An object of the present invention devised to solve the problem lies on a method for generating a codebook in a wireless communication system.

Another object of the present invention devised to solve the problem lies on an apparatus for generating a codebook in a wireless communication system.

Another object of the present invention devised to solve the problem lies on a method for transmitting feedback information for generating a codebook at a receiving end in a wireless communication system.

Another object of the present invention devised to solve the problem lies on an apparatus for transmitting feedback information for generating a codebook at a receiving end in a wireless communication system.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for generating a codebook at transmitting end in a wireless communication system, the method comprises generating a covariance matrix of a channel between the transmitting end and a receiving end, using a unitary matrix including a first vector corresponding to at least one quantized dominant singular vector of the channel and a second vector corresponding to at least one basis vector of a null space of the first vector; and transforming a predefined first codebook by applying the covariance matrix of the channel to the first codebook.

The method may further comprise receiving a codeword selected from a predefined second codebook from receiving end, wherein the codeword comprises the first and the second vector, wherein the covariance matrix generation comprises generating the covariance matrix based on the received codeword.

Alternatively, the method may further comprise receiving a codeword selected from predefined second codebook from receiving end, wherein the codeword comprises the first vector, wherein the second vector is generated by using the first vector according to a predefined rule between the transmitting end and the receiving end.

The covariance matrix of the channel may be a quantized full-rank matrix, a distance between the first vector and the second vector is minimum. The first vector is orthogonal to the second vector. The first and second vectors are column vectors of the unitary matrix. The covariance matrix of the channel is decomposed into the unitary matrix, a diagonal matrix, and a Hermitian matrix of the unitary matrix in Singular Value Decomposition (SVD). The diagonal matrix includes a ratio of a size of the second vector to a size of the first vector as a diagonal element. The diagonal element of the diagonal matrix has a non-zero value. The ratio of the size of the second vector to the size of the first vector changes according to a state of the channel.

In another aspect of the present invention, provided herein is a method for generating a codebook at a transmitting end in a wireless communication system, the method comprises receiving a codeword corresponding to a covariance matrix of a channel between the transmitting end and a receiving end from the receiving end; and transforming a predefined first codebook by applying the covariance matrix of the channel to the first codebook. The covariance matrix of the channel is generated using a unitary matrix including a first vector corresponding to at least one quantized dominant singular vector of the channel and a second vector corresponding to at least one basis vector of a null space of the first vector.

In a further aspect of the present invention, provided herein is a method for transmitting feedback for generating a codebook at a receiving end in a wireless communication system, the method comprises selecting a codeword from a predefined codebook based on at least one dominant singular vector and a channel between a transmitting end and the receiving end; and feeding back the selected codeword to the transmitting end.

The feedback information is information representing a long-term channel state or information representing a wideband channel state.

In a further aspect of the present invention, provided herein is a transmitting end for generating a codebook in a wireless communication system, the transmitting end comprises a processor for generating a covariance matrix of a channel between the transmitting end and a receiving end, using a unitary matrix including a first vector corresponding to at least one quantized dominant singular vector of the channel and a second vector corresponding to at least one basis vector of a null space of the first vector, and transforming a predefined first codebook by applying the covariance matrix of the channel to the first codebook.

The transmitting end further comprises a reception antenna for receiving from the receiving end a codeword selected from a predefined second codebook, wherein the codeword comprises the first and the second vector, wherein the processor generates the covariance matrix based on the received codeword.

Alternatively, the transmitting end further comprises a reception antenna for receiving a codeword selected from predefined second codebook from receiving end, wherein the codeword comprises the first vector, wherein the second vector is generated by using the first vector according to a predefined rule between the transmitting end and the receiving end.

In a further aspect of the present invention, provided herein is a transmitting end for generating a codebook in a wireless communication system, the transmitting end comprises a reception antenna for receiving a codeword corresponding to a covariance matrix of channel between the transmitting end and a receiving end; and a processor for transforming a predefined first codebook by applying the codeword to the first codebook.

The covariance matrix of the channel is generated using a unitary matrix including a first vector corresponding to at least one quantized dominant singular vector of the channel and a second vector corresponding to at least one basis vector of a null space of the first vector.

In a further aspect of the present invention, provided herein is a receiving end for transmitting feedback information for generating a codebook in a wireless communication system, and the receiving end comprises a processor for selecting a codeword from a predefined codebook based on at least one dominant singular vector and a channel between a transmitting end and the receiving end and includes a transmission antenna for feeding back the selected codeword to the transmitting end.

The feedback information is information representing a long-term channel state or information representing a wideband channel state. The predefined codebook comprises matrices including candidate vectors of a first vector, or comprises matrices including the candidate vectors of the first vector and candidate vectors of a second vector, or comprises matrices representing a covariance matrix of a channel between the transmitting end and a receiving end, wherein the first vector corresponds to at least one quantized dominant singular vector of the channel, and the second vector corresponds to at least one basis vector of a null space of the first vector.

Advantageous Effects

Compared to a conventional codebook including meaningless codewords that do not represent certain channels, a codebook according to the present invention solves the conventional problem of meaningless codewords and thus remarkably improves the communication performance of a transmitting end and a receiving end.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a $3^{rd}$ Generation Partnership Project Long Term Evolution (3GPP LTE) mobile communication system is being used. However, the description is applicable to any other mobile communication system except for specific features inherent to the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives. According to the present invention, a receiving end may be a UE and a transmitting end may be a BS, or vice versa.

Figure 1:
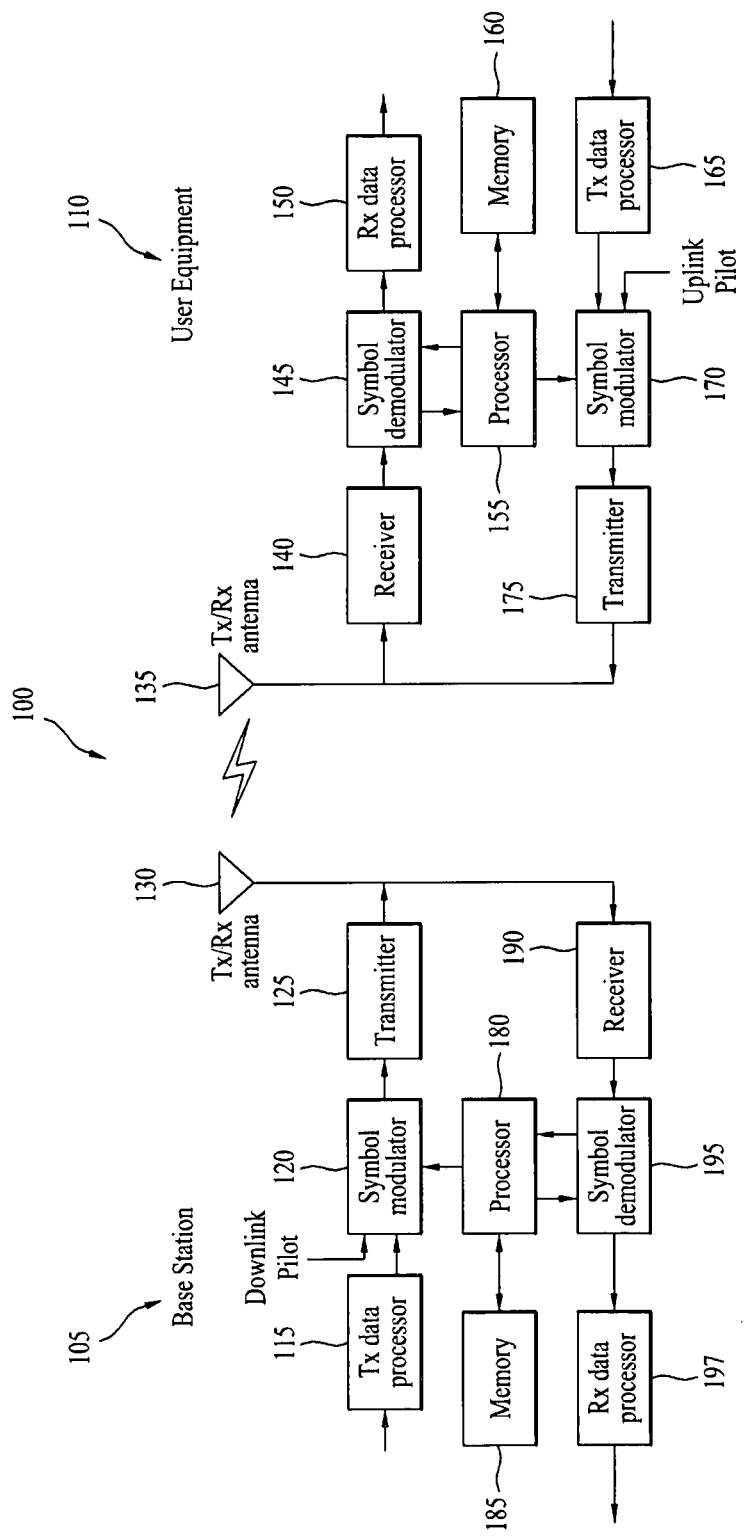
FIG. 1 is a block diagram of a Base Station (BS) and a User Equipment (UE) in a wireless communication system according to the present invention.

FIG. 1 is a block diagram of a BS and a UE in a wireless communication system according to the present invention.

While one BS 105 and one UE 110 are shown in FIG. 1 to simplify the configuration of a wireless communication system 100, the wireless communication system 100 may obviously include a plurality of BSs and/or a plurality of UEs.

Referring to FIG. 1, the BS 105 may include a Tx data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, they include multiple antennas. Hence, the BS 105 and the UE 110 support MIMO, specifically both Single User-MIMO (SU-MIMO) and Multi User-MIMO (MU-MIMO) in the present invention.

On the downlink, the Tx data processor 115 receives traffic data, processes the received traffic data through formatting, coding, interleaving, and modulation (i.e. symbol mapping), and thus outputs modulated symbols (or data symbols). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be Frequency Division Multiplexing (FDM) symbols, Orthogonal Frequency Division Multiplexing (OFDM) symbols, Time Division Multiplexing (TDM) symbols, or Code Division Multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the BS 105 and provides the received downlink signal to the receiver 140. The receiver 140 processes the downlink signal, for example, through filtering, amplification and frequency downconversion and converts the processed downlink signal to digital samples. The symbol demodulator 145 demodulates received pilot symbols and outputs the demodulated pilot symbols to the processor 155 for use in channel estimation.

The symbol demodulator 145 receives a frequency response estimate of the downlink from the processor 155 and acquires data symbol estimates (i.e. estimates of the transmitted data symbols) by demodulating the received data symbols using the frequency response estimate. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the BS 105 through the antenna 135.

The BS 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination of them. When a codebook is generated in hardware according to an embodiment of the present invention, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 155 and 180.

On the other hand, if a codebook is generated in firmware or software according to an embodiment of the present invention, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the UE and the network. The UE/BS and the network exchange RRC messages through the RRC layer.

One of the codebook design schemes proposed by or approved as recent communication standards such as those for mobile communication systems, Long Term Evolution (LTE), LTE-Advanced (LTE-A), Institute of Electrical and Electronics Engineers (IEEE) 802.16m, etc. is to transform a codebook using the long-term covariance matrix of channels, as determined by the following equation, [Equation 1]. Both the BS and the UE may carry out codebook transformation according to [Equation 1].

$$W' = \text{norm}(f(R)W) \quad \text{[Equation 1]}$$

where W denotes a conventional codebook representing short-term channel information, R denotes the long-term covariance matrix of a channel matrix H, and $f(R)$ is a function of the long-term covariance matrix R, for example, satisfying $f(R)=R$. The following description will be given on the assumption that $f(R)=R$. norm(A) denotes a matrix in which the norm is normalized to 1 for each column and W denotes a codebook achieved by transforming the conventional codebook W using the channel matrix H, the long-term covariance matrix R of the channel matrix H, and the norm matrix.

The long-term covariance matrix R of the channel matrix H may be given as $$R = E[H^H H]^{(a)} = V\Lambda V^H = \sum_{i=1}^{Nt} \sigma_i v_i v_i^H \quad \text{[Equation 2]}$$

where $E\lfloor H^H H \rfloor$ is decomposed into $V\Lambda V^H$ in Singular Value Decomposition (SVD), and $\sigma_i$ and $v_i$ are an $i^{th}$ singular value (i.e. an eigenvalue of an $i^{th}$ channel) and an $i^{th}$ singular column vector corresponding to the $i^{th}$ singular value, respectively ($\sigma_1 \geq \sigma_2 \geq \ldots \geq \sigma_{Nt}$). Given a single Tx stream, for example, the codebook W is an $N_t \times 1$ vector and the transformed codebook W' satisfies $$W' = \sum_{i=1}^{Nt} \sigma_i v_i (v_i^H W).$$

That is, the transformed codebook W' is determined to be a weighted linear combination of singular vectors. Herein, the weighted factor of the singular column vector $v_i$ is determined to be the product of the singular value $\sigma_i$ and the correlation $v_i^H W$ between the singular column vector $v_i$ and the pre-transformation codeword W.

As a consequence, codewords are densely populated around a dominant singular vector having a large $\sigma_i$ value in the codebook W'.

Figure 2:
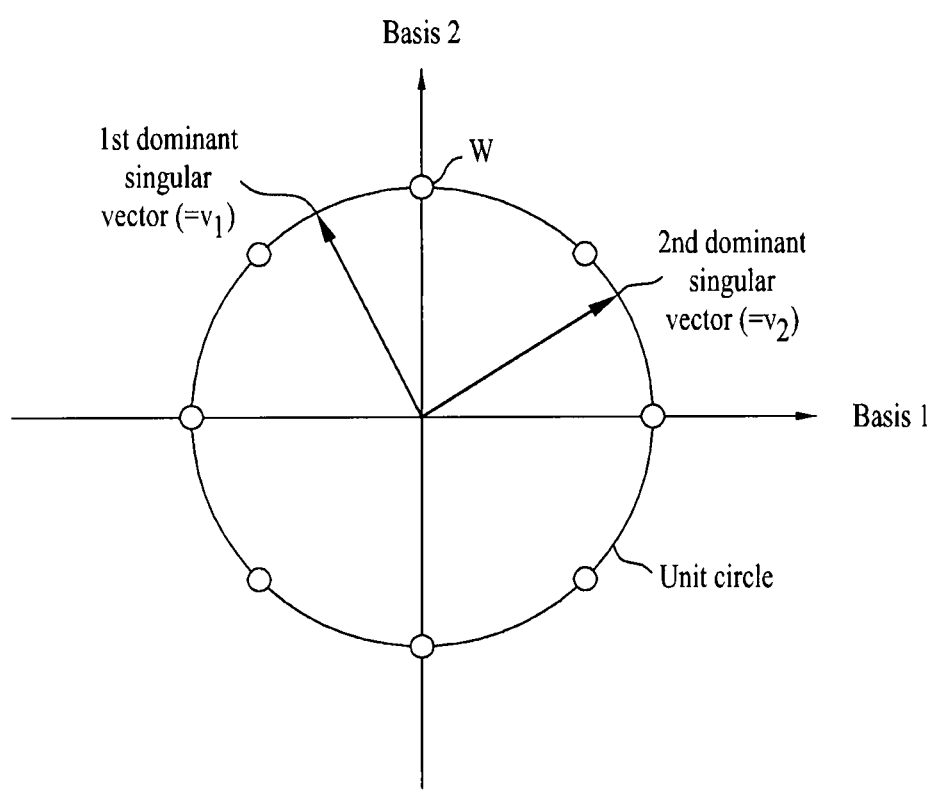
FIGS. 2 and 3 illustrate exemplary methods for generating a codebook.
Figure 3:
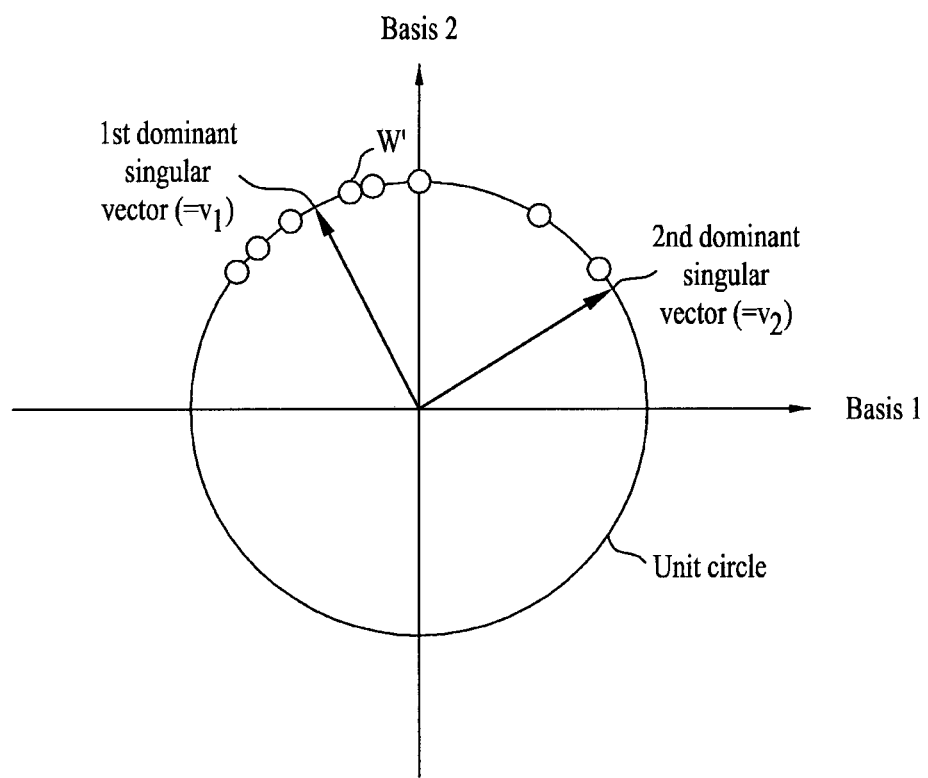

FIGS. 2 and 3 illustrate exemplary methods for generating a codebook.

In FIGS. 2 and 3, on the assumption that $N_t$ is 2 for the sake of convenience, singular vectors and a codebook W are defined in a two-dimensional space. Although any other codeword distribution is possible, the codebook w may have a uniform codeword distribution as illustrated in FIG. 2 according to a policy to maximize the minimum distance between two codewords in a Grassmannian space where channels exist.

The codebook design policy performs well for uncorrelated channels, while it performs poorly for correlated channels. Moreover, since the correlation between a singular vector of instantaneous channels H and a singular vector of a spatial covariance matrix R is high for correlated channels, it is effective to adaptively transform the codebook according to the spatial covariance matrix R based on the relationship.

FIG. 3 illustrates a transformed codebook. As described before, new codewords are densely populated around a first dominant singular vector having a large $\sigma_i$ value by applying a larger weighting factor to the first dominant singular vector. In this manner, as a first dominant singular vector of the long-term covariance matrix R of the channel matrix H is weighted with a higher weighting factor, the codebook W' has densely populated codewords around the first dominant singular vector, as illustrated in FIG. 3. However, in order to generate a codebook having good performance, a minimum distance needs to be maintained between codewords, while the codewords are densely populated around a dominant singular vector.

If the receiving end (e.g. a UE) feeds back a quantized version R of the long-term covariance matrix R to the transmitting end (e.g. a BS), taking into account feedback overhead, the transmitting end may obtain the transformed codebook W' by replacing the long-term covariance matrix R with the quantized version R in [Equation 1].

When the channel matrix H between the transmitting end and the receiving end describes correlated channels, a dominant singular value of the long-term covariance matrix R is very large, relative to the other singular values. This implies the channel matrix H has a directionality very close to the direction of a specific dominant singular vector among singular vectors resulting from decomposing the long-term covariance matrix R in SVD. Hereinafter, this direction is referred to as the strongest channel direction. This characteristic is observed in channels, when Tx or Rx antennas are not spaced enough physically from one another or a reflector or the transmitting end/receiving end moves fast.

As stated before, considering feedback overhead, an appropriate quantized version of the long-term covariance matrix R of channels may be fed back between the transmitting end and the receiving end. During the quantization, some singular vectors of the long-term covariance matrix R may be lost. For example, the receiving end (e.g. the UE) may feed back only a quantized value of a dominant singular vector V, to the transmitting end (e.g. the BS). In this case, the quantized long-term covariance matrix $\tilde{R}$ that the transmitting end (e.g. the BS) estimates based on the feedback information has a rank of 1 and as a result, the transformed codebook (or codewords) W' calculated by replacing the long-term covariance matrix R with the quantized version $\tilde{R}$ in [Equation 1] is 0 or the quantized value $\tilde{v}_i$. Consequently, the codebook W' may be meaningless since a part of its codewords are 0s, not representing channel characteristics and the other part of the codewords are $\tilde{v}_1$, representing only one direction, rather than it is an effective codebook having a dense codeword distribution in the strongest channel direction.

Even though the receiving end (e.g. the UE) transmits m (m>1) long-term feedbacks, $\tilde{v}_1, \tilde{v}_2, \ldots, \tilde{v}_m$ to the transmitting end (e.g. the BS) to avert the above problem, if a codeword W exists in an $(N_t-m)$-dimensional space that the long-term feedbacks $\tilde{v}_1, \tilde{v}_2, \ldots, \tilde{v}_m$ do not span, the same problem that a codeword W' corresponding to the codeword W is 0 still remains. In addition, if m=$N_t$, which means that the number of feedback singular vectors is equal to the number of Tx/Rx antennas, two values $\tilde{v}_i$ and $\tilde{v}_j$ may become equal during quantization, in spite of feedback of all singular vectors of the long-term covariance matrix R from the receiving end to the transmitting end. This case also faces the problem that some codewords W' are mapped to 0s.

Therefore, the estimated long-term covariance matrix $\tilde{R}$ is not a full-rank matrix due to the quantization and thus it may not be effective to transform codewords through multiplication of the long-term covariance matrix R as done in [Equation 1].

To solve the above-described problem, methods for transforming codewords by modifying the quantized long-term covariance matrix $\tilde{R}$ to a full-rank matrix are considered herein.

While the following description is given on the assumption that the number of Tx antennas is 4 ($N_t$=4) and one piece of long-term channel information (or long-term feedback information or wideband feedback information representing a wideband channel state), $\tilde{v}_1$, (i.e. the quantized value of one dominant singular vector $v_1$ described in [Equation 2]) is fed back, this is purely exemplary. Thus it is to be clearly understood that the same description is applicable to an extended case where m Tx antennas are used and n (n>1) dominant singular vectors are fed back over a long term.

The receiving end (e.g. the UE) may feed back the quantized dominant singular vector $\tilde{v}_1$, to the transmitting end (e.g. the BS). Then the transmitting end may generate the quantized long-term covariance matrix $\tilde{R}$ using the feedback information $\tilde{v}_1$, by $$\tilde{R} = [\tilde{v}_1 \ 0 \ 0 \ 0]\begin{bmatrix} 1 & 0 & 0 & 0 \\ 0 & 0 & 0 & 0 \\ 0 & 0 & 0 & 0 \\ 0 & 0 & 0 & 0 \end{bmatrix}\begin{bmatrix} \tilde{v}_1^H \\ 0 \\ 0 \\ 0 \end{bmatrix} \quad \text{[Equation 3]}$$

Codewords W' transformed using the quantized long-term covariance matrix $\tilde{R}$ according to [Equation 1] are determined by.

$$W' = \begin{cases} 0 & \text{if } W \text{ is orthogonal to } \tilde{v}_1 \\ \tilde{v}_1 & \text{otherwise} \end{cases} \quad \text{[Equation 4]}$$

Referring to [Equation 4], if a pre-transformation codeword W is orthogonal to the feedback singular vector $\tilde{v}_1$, its transformed codeword W' is 0. Otherwise, the transformed codeword W' is the feedback singular vector $\tilde{v}_1$. To solve the afore-described conventional problem, the transmitting end/receiving end may generate the quantized long-term covariance matrix $\tilde{R}$ by assuming dummy vectors $\bar{v}_2, \ldots, \bar{v}_{N_t}$ preset between the transmitting end and the receiving end as the other non-feedback singular vectors of the long-term covariance matrix R.

The dummy vectors may be $(N_t-1)$ basis vectors representing an $(N_t-1)$-dimensional null space of the feedback singular vector $\tilde{V}_1$. That is, the size of a long-term codeword is not a single $(N_t \times 1)$ vector but $N_t$ vectors including the non-dummy vector $\tilde{v}_1$ and the $(N_t-1)$ base vectors of the null space, $\bar{v}_2, \ldots, \bar{v}_{N_t}$.

A conventional codebook of size M including only non-dummy vectors and a codebook of size M including dummy vectors according to the present invention may be given as [Equation 5] and [Equation 6], respectively.

$$C=\{c_1, c_2, \ldots, c_M\}, \quad \text{[Equation 5]}$$

where $c_i$ is a Nt×1 vector.
which is based on the assumption that the receiving end feeds back the quantized dominant singular vector $\tilde{v}_1$, to the transmitting end.

$$C=\{\lfloor c_1(c_1)_1^\perp(c_1)_2^\perp(c_1)_3^\perp \rfloor, \\ \lfloor c_2(c_2)_1^\perp(c_2)_2^\perp(c_2)_3^\perp \rfloor, \ldots, \\ \lfloor c_M(c_M)_1^\perp(c_M)_2^\perp(c_M)_3^\perp \rfloor\}, \quad \text{[Equation 6]}$$

where $(c_i)_j^\perp$ denotes a $j^{th}$ basis vector of the null space of a vector $c_i$. The respective null-space basis vectors $(c_M)_1^\perp$, $(c_M)_2^\perp$ and $(c_M)_3^\perp$ are orthogonal to the vector $c_M$. The receiving end may select codeword so that distance between dominant singular vector $v_1$ and non-dummy vector $c_i$ of $i^{th}$ ($1 \le i \le M$) codeword is minimum. The receiving end needs to transmit the selected codeword to transmitting end. An exemplary codebook of the present invention created according to [Equation 6] may be expressed as $$C=\{C_1, C_2, \ldots C_M\} \quad \text{[Equation 7]}$$

where $C_n = I - 2c_n c_n^H/(c_n^H c_n)$ and $C_n$ corresponds to, for example, an $n^{th}$ rank-1 Precoding Matrix Index (PMI) described in an LTE standard document. The receiving end may select one codeword from the codebook C described as [Equation 7] based on the channels (or the channel matrix) between the transmitting end and the receiving end and the dominant singular vector $v_1$ and may feed back the selected codeword to the transmitting end. The codebook C may comprise candidate vectors of at least one quantized dominant singular vector of the channel between transmitting end and the receiving end, or the codebook C may comprise matrix including the candidate vectors of the at least one quantized dominant singular vector of the channel and candidate vectors of at least one basis vector of a null space of the at least one quantized dominant singular vector. Or the codebook C may comprise candidate vectors of the covariance matrix of the channel. The feedback codeword may be long-term feedback information representing a long-term channel state or wideband feedback information representing a wideband channel state. The transmitting end may generate the quantized long-term covariance matrix $\tilde{R}$ using the codeword $C_{opt}$ received from the receiving end according to [Equation 8]. [Equation 8] is for 4×4 MIMO.

$$\tilde{R} = C_{opt} \text{diag}(1\ \varepsilon_2\ \varepsilon_3\ \varepsilon_4) C_{opt}^H \quad \text{[Equation 8]}$$

$$= [\tilde{v}_1\ \overline{v}_2\ \overline{v}_3\ \overline{v}_4] \begin{bmatrix} 1 & 0 & 0 & 0 \\ 0 & \varepsilon_2 & 0 & 0 \\ 0 & 0 & \varepsilon_3 & 0 \\ 0 & 0 & 0 & \varepsilon_4 \end{bmatrix} \begin{bmatrix} \tilde{v}_1^H \\ \overline{v}_2^H \\ \overline{v}_3^H \\ \overline{v}_4^H \end{bmatrix}$$

$$= \tilde{v}_1 \tilde{v}_1^H + \left( \sum_{i=2}^{Nt} \varepsilon_i\ \overline{v}_i\ \overline{v}_i^H \right)$$

where $C_{opt}$ is represented as a full-rank codeword including the quantized dominant singular vector $\tilde{v}_1$ and dummy vectors. The receiving end (e.g. the UE) may determine the codeword $C_{opt}$ and feed back the codeword $C_{opt}$ to the transmitting end. For example, the receiving end may calculate a codeword $C_{opt}$ having a minimum quantization error by comparing non-dummy vectors of the codeword $C_{opt}$ with a dominant singular vector of the channels and may feed back the calculated codeword $C_{opt}$ to the transmitting end. $\overline{v}_2$, $\overline{v}_3$, and $\overline{v}_4$ are null-space basis vectors orthogonal to the quantized dominant singular vector $\tilde{v}_1$. $\epsilon_2$, $\epsilon_3$ and $\epsilon_4$ are weighting factors multiplied by the dummy vectors, which are real numbers smaller than 1. The receiving end may additionally feed back the weighting factors $\epsilon_2$, $\epsilon_3$ and $\epsilon_4$ to the transmitting end. If the weighting factors $\epsilon_2$, $\epsilon_3$ and $\epsilon_4$ are fixed to specific values, the receiving end does not need to feed back the weighting factors to the transmitting end. [Equation 9] describes a final transformed codebook W' obtained using the quantized covariance matrix $\tilde{R}$ described in [Equation 8] according to [Equation 1].

$$W' = \text{norm}(\tilde{R}W) = \text{norm}\left( \tilde{v}_1(\tilde{v}_1^H W) + \overbrace{\left( \sum_{i=2}^{Nt} \varepsilon_i \overline{v}_i (\overline{v}_i^H W) \right)}^{(a)} \right) \quad \text{[Equation 9]}$$

where a part (a) functions to prevent a codeword of the codebook W' from being 0 or $\tilde{v}_1$ so that codewords are densely distributed around the quantized dominant singular vector $\tilde{v}_1 \tilde{V}_1$ in the codebook W', as illustrated in FIG. 2.

As described before with reference to [Equation 8] and [Equation 9], a weighting factor $\epsilon_i$ determines the size of a dummy vector $\overline{v}_i$ relative to the size of the quantized dominant singular vector $\tilde{v}_1$, satisfying $\epsilon_i \ll 1$. The weighting factor $\epsilon_i$ is fixed to a specific value, or determined in every predetermined short or long term according to a channel change rate and fed back to the transmitting end by the receiving end (e.g. the UE). For instance, if a channel changes fast, the weighting factor $\epsilon_i$ may be increased such that the codewords of the codebook W' are distributed over a wide area around the quantized dominant singular vector $\tilde{v}_1$ illustrated in FIG. 2. If the receiving end represents the weighting factor $\epsilon_i$ in n bits (n is an integer larger than 1) and the quantized dominant singular vector $\tilde{v}_1$ in m bits (m is an integer larger than 1) and feeds back the two pieces of information over a long term to the transmitting end, a total feedback payload size is 3n+m bits.

It has been described above that the receiving end feeds back one singular vector (i.e. $\tilde{v}_1$) of the covariance matrix R to the transmitting end, by way of example. If n singular vectors (n is an integer larger than 1), the weighting factor E may be defined as $\epsilon_i = Q(\sigma_i/\sigma_1)$ where $Q(\cdot)$ is a quantization function and $\sigma_i$ is an $i^{th}$ singular value (i.e. an eigenvalue of an $i^{th}$ channel, $1 < i \leq n$).

In another example, when the receiving end feeds back two singular vectors to the transmitting end, the quantized covariance matrix $\tilde{R}$ may be given as $$\tilde{R} = [\tilde{v}_1\ \tilde{v}_2\ \overline{v}_3\ \overline{v}_4] \begin{bmatrix} 1 & 0 & 0 & 0 \\ 0 & \varepsilon_2 & 0 & 0 \\ 0 & 0 & \varepsilon_3 & 0 \\ 0 & 0 & 0 & \varepsilon_4 \end{bmatrix} \begin{bmatrix} \tilde{v}_1^H \\ \tilde{v}_2^H \\ \overline{v}_3^H \\ \overline{v}_4^H \end{bmatrix} \quad \text{[Equation 10]}$$

where the diagonal matrix of the quantized covariance matrix $\tilde{R}$ is configured by assuming 1 as the size of the quantized dominant singular vector $\tilde{v}_1$ and assuming $\sqrt{\epsilon_i}$ as the sizes of the dummy vectors. However, if the receiving end includes a singular vector of the covariance matrix R and a singular value corresponding to the singular vector in long-term feedback information, [Equation 10] may be modified to $$\tilde{R} = C_{opt} \text{diag}(\tilde{\sigma}_1 \epsilon_2 \epsilon_3 \epsilon_4) C_{opt}^H \quad \text{[Equation 11]}$$

where $\sigma_1$ is a first singular value (i.e. an eigenvalue of a first channel) and $\tilde{\sigma}_1$ is a quantized value of the first singular value $\sigma_1$, satisfying $\epsilon_i \ll \tilde{\sigma}_1$.

In addition, when the transmitting end receives the conventional long-term codebook described in [Equation 5] as feedback information from the receiving end, it may configure the quantized covariance matrix $\tilde{R}$ according to [Equation 12] in order to solve the afore-described conventional problem.

$$\tilde{R} = \tilde{v}_1 \tilde{v}_1^H + \epsilon I \quad \text{[Equation 12]}$$

where $\epsilon \ll 1$. When the receiving end also feeds back the quantized value $\tilde{\sigma}_1$, [Equation 12] may be modified to $$R = \tilde{\sigma}_1 \tilde{v}_1 \tilde{v}_1^H + \epsilon I \quad \text{[Equation 13]}$$

where $\epsilon \ll \tilde{\sigma}_1$ and $\sigma_1$ is a first singular value (i.e. an eigenvalue of a first channel).

While the receiving end selects an optimum codeword from the codebook C of [Equation 6] as a long-term codebook and feeds back the selected codeword to the transmitting end and the transmitting end generates the quantized long-term covariance matrix $\tilde{R}$ using the feedback codeword in the above proposed scheme, the receiving end may feed back the whole quantized long-term covariance matrix $\tilde{R}$ to the transmitting end in another scheme. Then a long-term codebook C may be designed according to [Equation 14].

$$C' \{ C_i \text{diag}(1 c_j^1 c_k^2 c_l^3) C_i^H | i = \{1, 2, \ldots, M\}, j = \{1, 2, \ldots, N\}, k = \{1, 2, \ldots, O\}, l = \{1, 2, \ldots, P\} \} \quad \text{[Equation 14]}$$

where $C_i$ is a codeword in the codebook C described as [Equation 6] and $c_j^1$, $c_k^2$, $c_l^3$ are real numbers between 0 and 1. To reduce the size of the codebook, $c_j^1$, $c_k^2$, $c_l^3$ may be limited to is or real numbers much smaller than 1, $\epsilon$. A part $C_i \text{diag}(1 c_j^1, c_k^2, c_l^3) C_i^H$ corresponds to the quantized covariance matrix $\tilde{R}$ of [Equation 8].

Apart from the method for generating a new transformed codebook by multiplying short-term feedback information by long-term feedback information as done in [Equation 14], a transformed codebook may be generated by adding long-term feedback information to short-term feedback information. If the long-term feedback information is $\tilde{v}_1$, the transformed codebook W is generated by $$W' = norm(\tilde{v}_1 + \overset{(a)}{\varepsilon W})  \quad \text{[Equation 15]}$$

where W is the short-term feedback information and $\epsilon$ is a real number much smaller than 1 ($\epsilon \ll 1$). $\epsilon$ is fixed to a value preset between the transmitting end and the receiving end, or determined in every predetermined short or long term according to a channel change rate and fed back to the transmitting end by the receiving end. For example, if a channel changes fast, $\epsilon$ may be increased such that the codewords of the transformed codebook W' are distributed over a wide area around the quantized dominant singular vector $\tilde{v}_1$.

When the receiving end feeds back the quantized singular value $\tilde{\sigma}_1$ as well as the quantized dominant singular vector $\tilde{v}_1$ as long-term feedback information to the transmitting end, the transformed codebook W' may be determined by $$W' = norm(\tilde{\sigma}_1 \tilde{v}_1 + \overset{(a)}{\varepsilon W}) \quad \text{[Equation 16]}$$

where it is assumed that the quantized singular value $\tilde{\sigma}_1$ satisfies the condition that $\epsilon \ll \tilde{\sigma}_1$.

Alternatively, the transmitting end may receive a covariance matrix $\tilde{R}$ of a channel between the transmitting end and a receiving end from the receiving end. The transmitting end may transform the a predefined codebook W by applying the covariance matrix of the channel to the codebook W. In this case, the covariance matrix of the channel is generated by receiving end using a unitary matrix including at least one quantized dominant singular vector of the channel and at least one basis vector of a null space of the first vector.

While a conventional codebook has meaningless codewords that do not represent certain channels or the directions of the channels, various codebooks of the present invention solve the conventional problem and remarkably improve the communication performance of a transmitting end and a receiving end.

MODE FOR INVENTION

Various embodiments have been described in the best mode for carrying out the invention.

INDUSTRIAL APPLICABILITY

An apparatus and method for generating a codebook in a wireless communication system according to the present invention are applicable to mobile communication systems such as 3GPP LTE, LTE-A, and IEEE 802.16 systems.

Embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that do not explicitly cite in each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for generating a codebook at a transmitting end in a wireless communication system, the method comprising:
generating, by the transmitting end, a covariance matrix of a channel between the transmitting end and a receiving end, using a unitary matrix including:
a first vector corresponding to at least one quantized dominant singular vector of the channel; and
a second vector corresponding to at least one basis vector of a null space of the first vector; and
transforming, by the transmitting end, a predefined first codebook by applying the covariance matrix of the channel to the first codebook.

2. The method according to claim 1, further comprising:
receiving, by the transmitting end from the receiving end, a codeword selected from a predefined second codebook, wherein the codeword comprises the first and the second vector, and
wherein the covariance matrix generation comprises generating the covariance matrix based on the received codeword.

3. The method according to claim 1, further comprising:
receiving, by the transmitting end from the receiving end, a codeword selected from predefined second codebook, wherein the codeword comprises the first vector, and
wherein the second vector is generated by using the first vector according to a predefined rule between the transmitting end and the receiving end.

4. The method according to claim 1, wherein the covariance matrix of the channel is a quantized full-rank matrix.

5. The method according to claim 1, wherein a distance between the first vector and the second vector is minimum.

6. The method according to claim 1, wherein the first vector is orthogonal to the second vector.

7. The method according to claim 1, wherein the first and second vectors are column vectors of the unitary matrix.

8. The method according to claim 1, wherein the covariance matrix of the channel is decomposed into the unitary matrix, a diagonal matrix, and a Hermitian matrix of the unitary matrix in Singular Value Decomposition (SVD).

9. The method according to claim 8, wherein the diagonal matrix includes a ratio of a size of the second vector to a size of the first vector as a diagonal element.

10. The method according to claim 9, wherein the diagonal element of the diagonal matrix has a non-zero value.

11. The method according to claim 9, wherein the ratio of the size of the second vector to the size of the first vector changes according to a state of the channel.

12. A method for generating a codebook at a transmitting end in a wireless communication system, the method comprising:

receiving, by the transmitting end from a receiving end, a codeword corresponding to a covariance matrix of a channel between the transmitting end and the receiving end from the receiving end; and transforming, by the transmitting end, a predefined first codebook by applying the codeword to the first codebook, wherein the covariance matrix of the channel is generated using a unitary matrix including:
- a first vector corresponding to at least one quantized dominant singular vector of the channel, and
- a second vector corresponding to at least one basis vector of a null space of the first vector.

13. A method for transmitting feedback information for generating a codebook at a receiving end in a wireless communication system, the method comprising:

selecting, by the receiving end, a codeword from a predefined codebook based on at least one dominant singular vector and a channel between a transmitting end and the receiving end; and feeding back, by the receiving end to the transmitting end, the selected codeword, wherein the feedback information is information representing a long-term channel state or information representing a wideband channel state.

14. A receiving end for transmitting feedback information for generating a codebook in a wireless communication system, the receiving end comprising:

a processor for selecting a codeword from a predefined codebook based on at least one dominant singular vector and a channel between a transmitting end and the receiving end; and a transmission antenna for feeding back the selected codeword to the transmitting end, wherein the feedback information is information representing a long-term channel state or information representing a wideband channel state.

15. The receiving end according to claim 14, wherein:

the predefined codebook comprises:
- matrices including candidate vectors of a first vector; or
- matrices including the candidate vectors of the first vector and candidate vectors of a second vector; or
- matrices representing a covariance matrix of a channel between the transmitting end and a receiving end;

the first vector corresponds to at least one quantized dominant singular vector of the channel; and the second vector corresponds to at least one basis vector of a null space of the first vector.

* * * * *